(12) United States Patent
Chamberlin et al.

(10) Patent No.: US 8,362,665 B2
(45) Date of Patent: Jan. 29, 2013

(54) LIQUID COOLED STATOR TERMINAL BLOCK FOR AN ELECTRIC MACHINE

(75) Inventors: Bradley D. Chamberlin, Pendleton, IN (US); Victor Kernus, Fairfax Station, VA (US)

(73) Assignee: Remy Technologies, L.L.C., Pendleton, IN (US)

( * ) Notice: Subject to any disclaimer, the term of this patent is extended or adjusted under 35 U.S.C. 154(b) by 400 days.

(21) Appl. No.: 12/616,416

(22) Filed: Nov. 11, 2009

(65) Prior Publication Data

US 2010/0139896 A1 Jun. 10, 2010

(51) Int. Cl.
H02K 5/20 (2006.01)
(52) U.S. Cl. ................. 310/71; 310/54; 310/64
(58) Field of Classification Search .......... 310/52, 310/54, 71, 64; 165/104.33; 439/106–206
See application file for complete search history.

(56) References Cited

U.S. PATENT DOCUMENTS

| | | | | |
|---|---|---|---|---|
| 2,067,139 A * | 1/1937 | Ehrke | | 378/141 |
| 2,683,227 A * | 7/1954 | Beckwith | | 310/55 |
| 2,702,311 A * | 2/1955 | Botterill et al. | | 174/19 |
| 2,742,582 A * | 4/1956 | Bahn et al. | | 310/52 |
| 2,836,640 A * | 5/1958 | Mueller | | 136/228 |
| 2,914,598 A * | 11/1959 | Spillane | | 174/15.7 |
| 3,133,145 A * | 5/1964 | Bahn | | 174/15.6 |
| 3,601,520 A * | 8/1971 | Carasso | | 174/15.7 |
| 3,764,724 A * | 10/1973 | Mulvany | | 174/15.7 |
| 4,063,790 A * | 12/1977 | Kleykamp et al. | | 439/191 |
| 4,133,992 A * | 1/1979 | Walker et al. | | 200/81 R |
| 4,317,952 A * | 3/1982 | Armor et al. | | 174/15.3 |
| 4,487,990 A * | 12/1984 | Lane et al. | | 174/15.7 |
| 4,669,791 A * | 6/1987 | Savill | | 439/34 |
| 4,682,068 A * | 7/1987 | Cotzas et al. | | 310/198 |
| 4,712,029 A * | 12/1987 | Nold | | 310/71 |
| 4,941,349 A * | 7/1990 | Walkow et al. | | 73/152.54 |
| 5,229,543 A * | 7/1993 | Strefling | | 174/15.6 |
| 5,780,770 A * | 7/1998 | Christianson et al. | | 174/15.1 |
| 5,814,909 A * | 9/1998 | Yamada et al. | | 310/64 |
| 6,100,467 A * | 8/2000 | Kroulik | | 174/15.1 |
| 6,677,531 B2 * | 1/2004 | Fukushima et al. | | 174/84 C |
| 7,508,101 B2 * | 3/2009 | Kaminski et al. | | 310/54 |
| 7,939,753 B2 * | 5/2011 | Dung | | 174/15.1 |
| 2006/0181162 A1 * | 8/2006 | Pierret et al. | | 310/58 |
| 2007/0248934 A1 * | 10/2007 | Mosimann | | 433/126 |

* cited by examiner

Primary Examiner — Quyen Leung
Assistant Examiner — Naishadh Desai
(74) Attorney, Agent, or Firm — Cantor Colburn LLP

(57) ABSTRACT

An electric machine including a housing having an outer surface and an inner surface that defines an interior portion. The housing includes a connection zone. A fluid circuit passes, at least in part, through the housing. The fluid circuit includes an inlet portion and an outlet portion. A stator assembly is arranged within the interior portion of the housing. The stator assembly includes at least one connector lead, and a terminal block extending through the housing. The terminal block includes a non-electrically conductive member that is sealed against the housing. The non-electrically conductive member includes a fluid cavity. At least one electrically conductive member is covered, at least in part, by the non-electrically conductive member. The fluid cavity guides a fluid along a portion of the at least one electrically conductive member to absorb heat.

19 Claims, 4 Drawing Sheets

LIQUID COOLED STATOR TERMINAL BLOCK FOR AN ELECTRIC MACHINE

BACKGROUND OF THE INVENTION

Exemplary embodiments pertain to the art of electric machines and, more particularly, to an electric machine including a liquid cooled stator terminal block.

Many electrical machines, such as alternating current electric motors and generators, include a stator assembly and a rotor assembly arranged in a housing. High voltage leads pass from the stator assembly through the housing. In most cases, the high voltage leads, which take the form of copper bars having limited flexibility, exit axially from the housing and terminate at a terminal block. In many cases, axial space constraints exist that force a reduction in an overall length of the machine. Reducing the size of the machine often results in a corresponding reduction in machine performance. To provide an interface to the terminal block the leads usually include a ring connector. A similar ring connector is provided on an associated connecting cable. A bolt passes through each ring connector and into a threaded portion of the terminal block to form a connection to the electrical machine. At this point, additional covers, cavities, and/or seals are required to protect the connection from the elements, foreign object contact or to provide additional insulation between adjacent connections.

One solution is to connect the leads to a terminal block that extends into the electric machine. In addition, to providing a connection point, the terminal block shields the motor connections from environmental conditions as well as from inadvertent contact. The terminal also retains heat generated by the electrical flow through the conductors. In addition, to routing and protecting the connections, the terminal block retains heat generated by the overall operation of the electric machine. An excessive build-up of heat can lead to premature component failure.

BRIEF DESCRIPTION OF THE INVENTION

Disclosed is an electric machine including a housing having an outer surface and an inner surface that defines an interior portion. The housing includes a connection zone. A fluid circuit passes, at least in part, through the housing. The fluid circuit includes an inlet portion and an outlet portion. A stator assembly is arranged within the interior portion of the housing. The stator assembly includes at least one connector lead, and a terminal block extending through the housing. The terminal block includes a non-electrically conductive member that is sealed against the housing. The non-electrically conductive member includes a fluid cavity. At least one electrically conductive member is covered, at least in part, by the non-electrically conductive member. The fluid cavity guides a fluid along a portion of the at least one electrically conductive member to absorb heat.

Also disclosed is a terminal block including a non-electrically conductive member including a fluid cavity, and at least one electrically conductive member covered, at least in part, by the non-electrically conductive member. The fluid cavity guides a fluid along a portion of the at least one electrically conductive member to absorb heat.

Still further disclosed is a method of cooling a stator terminal block includes passing a fluid through a portion of an electric machine, guiding the fluid through a fluid cavity formed in a non-electrically conductive portion of a terminal block mounted to the housing, receiving heat from a portion of an electrically conductive member provided in the terminal block into the fluid; and passing the fluid out from the terminal block.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

Figure 1:
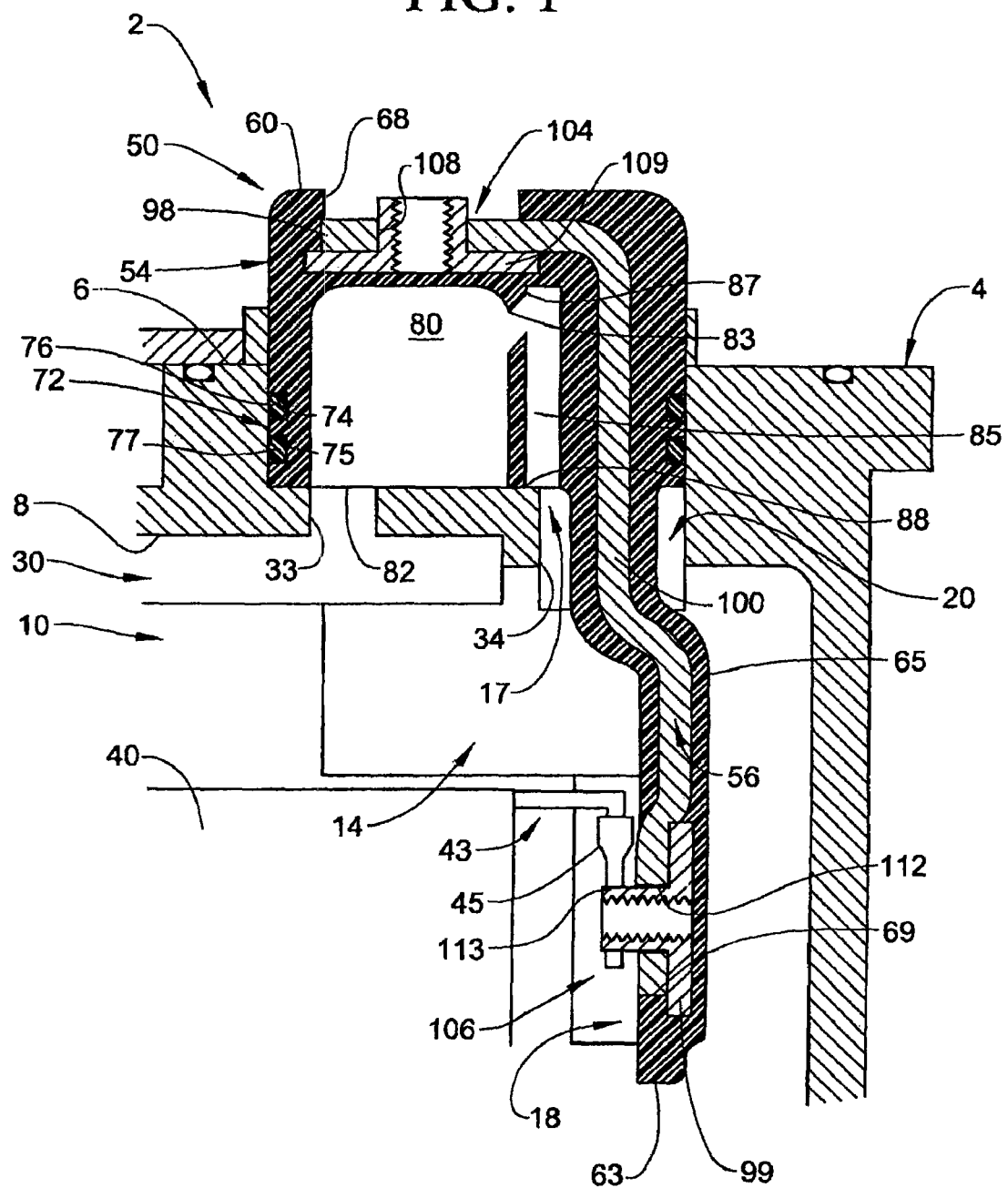
FIG. 1 is a partial cross-sectional view of an electric machine including a liquid cooled stator terminal block in accordance with an exemplary embodiment.
Figure 2:
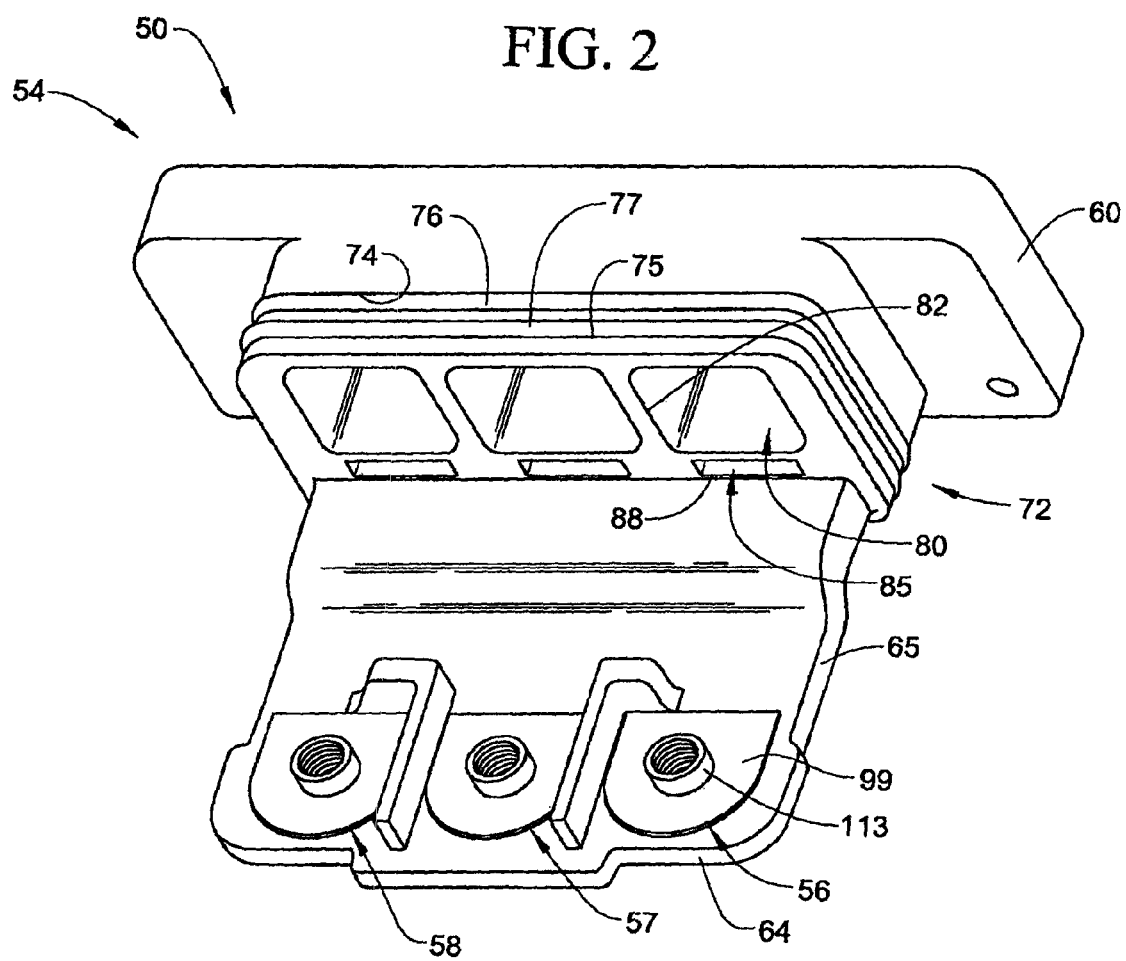
FIG. 2 is a perspective view of a liquid cooled terminal block of FIG. 1.

A detailed description of one or more embodiments of the disclosed apparatus is presented herein by way of exemplification. As shown in FIGS. 1 and 2, an electric machine that takes the form of an electric motor in accordance with an exemplary embodiment is indicated generally at 2. Electric motor 2 includes a housing 4 having an outer surface 6 and an inner surface 8 that defines an interior portion 10. Housing 4 includes a connection zone 14 having a first end portion 17 that extends to a second end portion 18 through a connection passage 20. In the exemplary embodiment shown, connection passage 20 is coupled to a fluid circuit 30 having an inlet portion 33 and an outlet portion 34. Electric machine 2 also includes a stator assembly 40 having a connector lead 43 provided with a ring connector 45. As will be detailed more fully below, stator assembly 40 includes a terminal block 50 that provides an interface between electric motor 2 and external components (not shown).

Terminal block 50 includes a non-electrically conductive member 54 that covers or encapsulates, at least in part, a plurality of electrically conductive members 56-58. More specifically, in one embodiment, non-electrically conductive member 54 is over-molded onto electrically conductive members 56-58. At this point, it should be understood that while shown with three of electrically conductive members, terminal block 50 can include more than three electrically conductive members or fewer than three electrically conductive members and even just a single electrically conductive member depending upon the particular design of electric machine 2. Non-electrically conductive member 54 includes a first end or crown portion 60 that extends to a second end 63 through an intermediate or leg portion 65.

As shown, crown portion 60 includes an opening 68 that provides access to a portion of electrically conductive member 56. Second end 63 includes an opening 69 that provides access to another portion of electrically conductive member 56. Crown portion 60 is also shown to include a seal land 72 including first and second grooves 74 and 75 that are configured to receive corresponding first and second seals 76 and 77. Seals 76 and 77 are configured and disposed to fluidly seal non-electrically conductive member 54 within connection passage 20. However, seals 76 and 77 can provide a non-fluidic seal and simply serve to prevent foreign debris from entering electric motor 2.

Crown portion 60 is also shown to include a plurality of fluid cavities, one of which is shown at 80 associated with electrically conductive member 56, that are configured to receive fluid passing through fluid circuit 30 in a manner that will become more fully evident below. Towards that end, fluid cavity 80 extends along a portion of electrically conductive member 56. Other fluid cavities are associated with respective ones of electrically conductive members 57 and 58. Fluid cavity 80, in a manner that will be detailed more fully below, includes an inlet 82 that is fluidly connected to inlet portion 33 and an outlet 83 that is fluidly connected to outlet portion 34. In the exemplary embodiment shown, outlet 83 is fluidly connected to outlet portion 34 via a fluid passage 85 that extends along another portion of electrically conductive member 56. Fluid passage 85 includes an inlet section 87 that is linked with outlet 83. Inlet section 87 extends to an outlet section 88 that is fluidly connected to outlet portion 34.

As each electrically conductive member 56-58 is similarly formed, a detailed description will follow with reference to electrically conductive member 56 with an understanding that electrically conductive members 57 and 58 include similar structure. Electrically conductive member 56 includes a first end section 98 that extends to a second end section 90 through an intermediate section 100. First end section 98 defines a first connection zone 104 while second end section 99 defines a second connection zone 106. First connection zone 104 includes an orifice 108 that is configured and disposed to receive a connecting member 109. Connecting member 109 provides an interface to an external electrical conductor (not shown). Similarly, second connection zone 106 includes an orifice 112 that is configured to receive a connecting member 113. Connecting member 113 is configured and disposed to receive ring connector 45. As shown, first connection zone 104 is substantially perpendicular relative to second connection zone 106. Substantially perpendicular should be understood to mean that first connection zone 104 is at about a 90°± about 10° angle relative to second connection zone 106. However, other angles from 0°-180° can also be employed.

In accordance with the exemplary embodiment, fluid passing through fluid circuit 30 enters into fluid cavity 80 via inlet 82. The fluid fills fluid cavity 80 and provides a heat exchange medium that carries away heat generated by electrical flow passing through electrically conductive member 56. That is, the fluid flows along and absorbs heat from first end section 98 to become a heat-entrained fluid thereby lowering temperatures at first connection zone 104. The heat-entrained fluid passes from fluid cavity 80 into fluid passage 85 and along intermediate section 100. The heat-entrained fluid passing through fluid passage 85 absorbs additional heat from electrically conductive member 56 to provide an additional cooling effect. The heat-entrained fluid then passes from fluid passage 85 via outlet section 88 back into electric motor 2. The fluid is cooled by, for example, a fan (not shown) mounted to a rotor member (also not shown) of electrical machine 2. Once the heat is removed, the fluid re-enters electric machine 2 is circulated in a manner similar to that described above. Of course, it should be understood that the fluid could exit from terminal block 50 and be circulated through an external fluid cooling system or simply passed to a drain. With this arrangement, terminal block 50 not only provides a robust machine attachment terminal, but also provides passages for channeling fluid in proximity to electrical conductors in order to carry away generated heat while maintaining a compact form factor and without sacrificing motor performance. At this point it should be understood that while the fluid is described as flowing along portions of electrically conductive member 56, the term "along" should be construed to include fluid flowing in proximity to and/or in direct contact with electrically conductive member 56.

Figure 3:
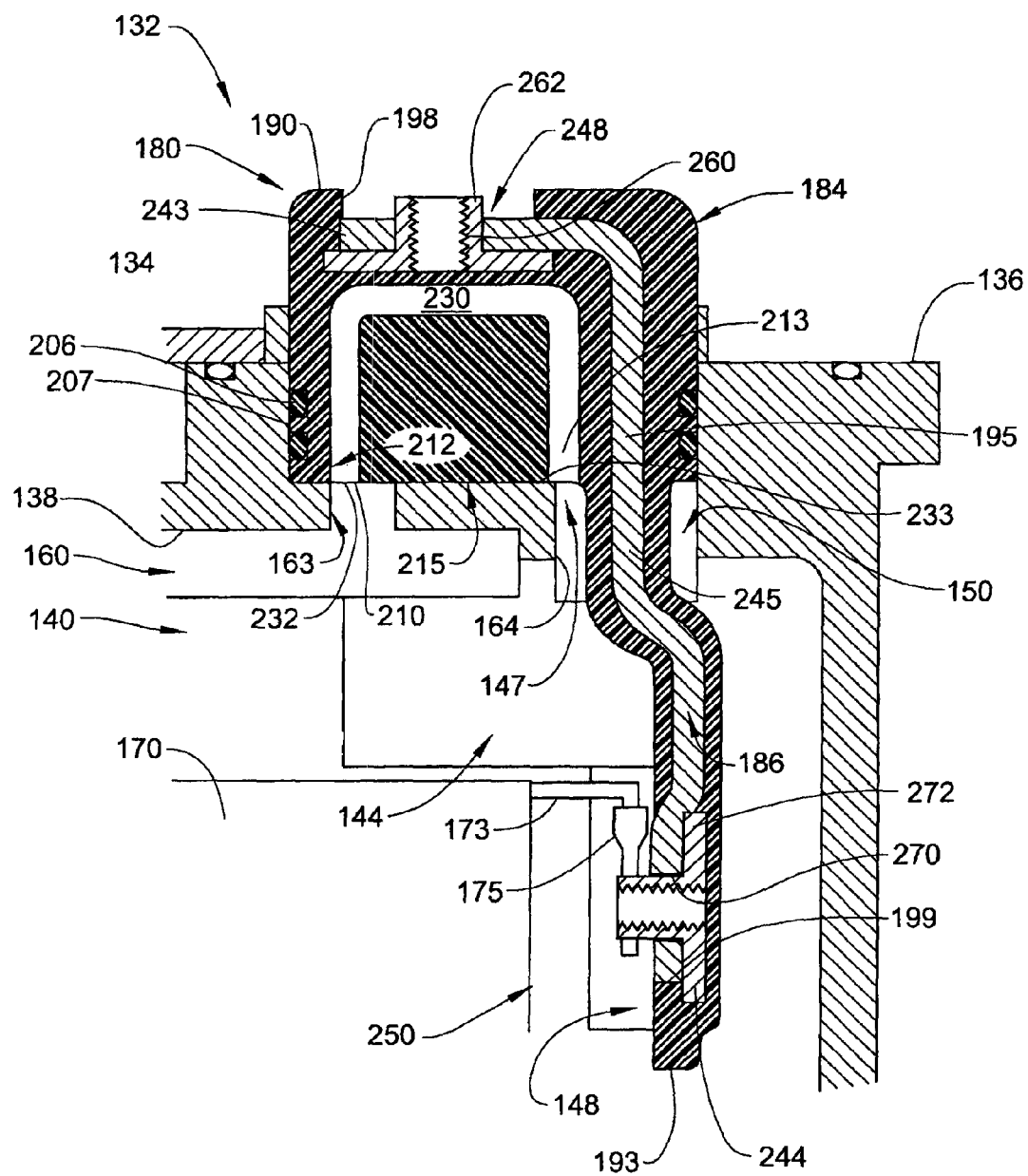
FIG. 3 is a partial cross-sectional view of an electric machine including a liquid cooled stator terminal block in accordance with an exemplary embodiment.
Figure 4:
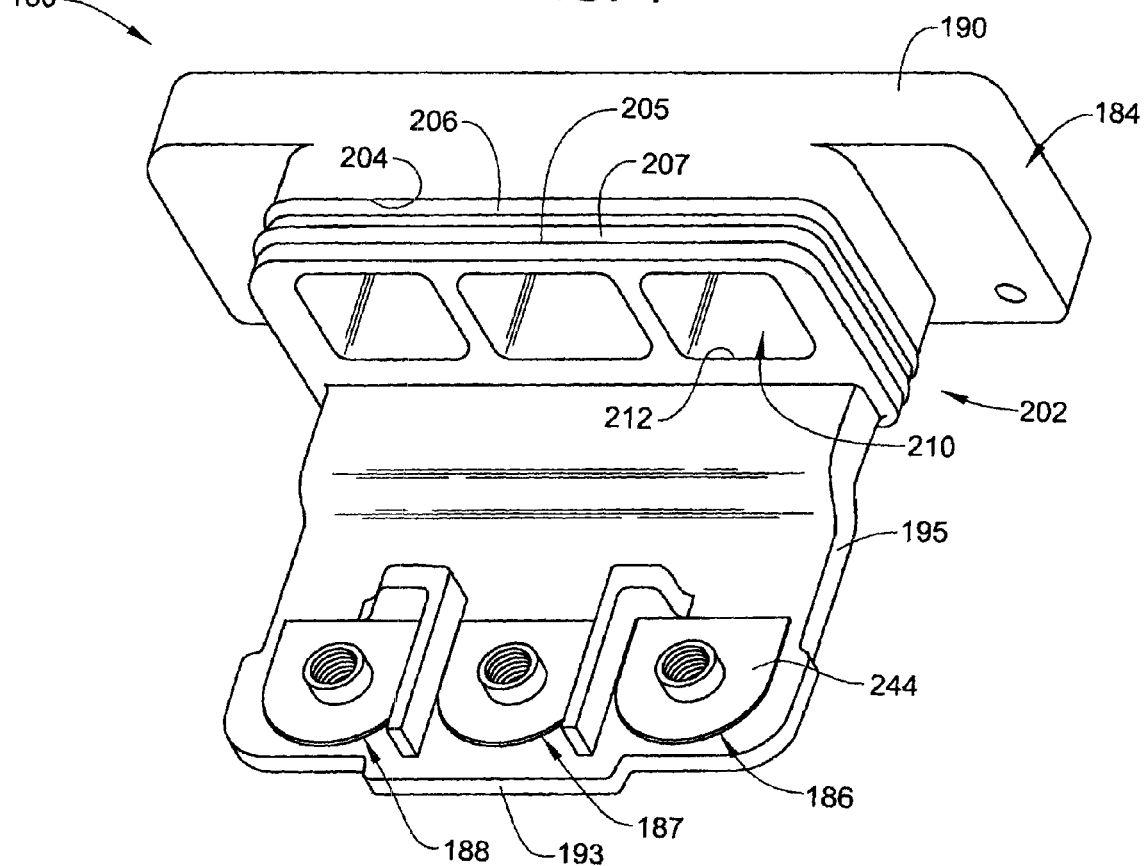
FIG. 4 is a perspective view of a liquid cooled terminal block of FIG. 3 in accordance with an exemplary embodiment.

Reference will now be made to FIGS. 3 and 4 in describing an electric machine 132 constructed in accordance with another exemplary embodiment. Electric machine 132 includes a housing 134 having an outer surface 136 and an inner surface 138 that defines an interior portion 140. Housing 134 includes a connection zone 144 having a first end portion 147 that extends to a second end portion 148 through a connection passage 150. In the exemplary embodiment shown, connection passage 150 is coupled to a fluid circuit 160 having an inlet portion 163 and an outlet portion 164. Electric machine 132 also includes a stator assembly 170 having a connector lead 173 provided with a ring connector 175. As will be detailed more fully below, stator assembly 170 includes a terminal block 180 that provides an interface between electric machine 132 and external components (not shown).

Terminal block 180 includes a non-electrically conductive member 184 that covers or encapsulates, at least in part, a plurality of electrically conductive members 186-188. More specifically, in one embodiment, non-electrically conductive member 184 is over-molded onto electrically conductive members 186-188. At this point, it should be understood that while shown with three electrically conductive members, terminal block 180 can include more than three or even a single electrically conductive member depending upon the particular design of electric machine 132. Non-electrically conductive member 184 includes a first end or crown portion 190 that extends to a second end 193 through an intermediate or leg portion 195.

As shown, crown portion 190 includes an opening 198 that provides access to a portion of electrically conductive member 186. Similarly, second end 193 includes an opening 199 that provides access to another portion of electrically conductive member 186. Crown portion 190 is also shown to include a seal land 202 having first and second grooves 204 and 205 that are configured and disposed to receive corresponding first and second seals 206 and 207. In accordance with an exemplary embodiment, seals 206 and 207 are configured and disposed to fluidly seal non-electrically conductive member 184 within connection passage 150. However, seals 206 and 207 can also provide a non-fluidic seal that simply prevents foreign debris from entering housing 134.

Crown portion 190 is also shown to include a plurality of fluid cavities, one of which as indicated at 210 and associated with electrically conductive member 186, that are configured to receive fluid passing through fluid circuit 160 in a manner that will be detailed more fully below. The remaining fluid cavities are associated the other electrically conductive members 187 and 188 respectively. Fluid cavity 210 includes an inlet 212 that leads to an outlet 213. In accordance with the exemplary embodiment shown, terminal block 180 includes an insert member 215 that is configured to be arranged within fluid cavity 210.

Figure 5:
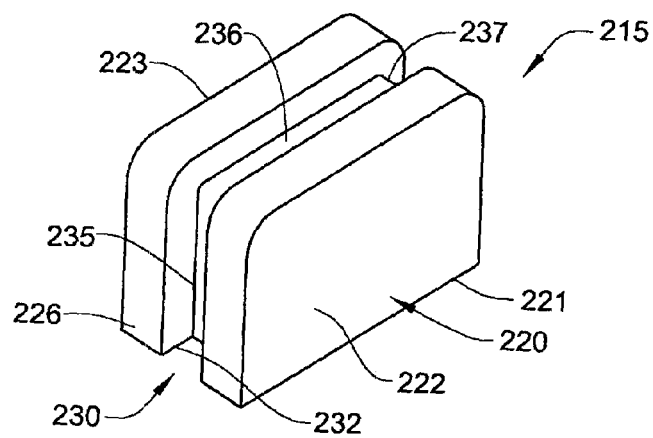
FIG. 5 is a perspective view of a cooling passage insert for a liquid cooled terminal block in accordance with an exemplary embodiment.

As best shown in FIG. 5, insert member 215 includes a main body 220 having a base portion 221 including a first substantially planar surface 222 and an opposing, second substantially planar surface 223. Insert member 215 is also shown to include a peripheral edge 226 having formed therein a fluid passage 230. Fluid passage 230 includes an inlet section 232 that leads to an outlet section 233. More specifically, fluid passage 230 includes a first portion 235 that extends from inlet section 232 towards a second portion 236. Second portion 236 extends to a third portion 237 that leads to outlet section 233. In the exemplary embodiment shown, second portion 236 fluidly links first and third portions 235 and 237. Fluid passage 230 delivers a fluid from fluid circuit 160 into a heat exchange relationship with electrically conductive member 186 in a matter that will describe more fully below.

As each electrically conductive member 186-188 is similarly formed, a detailed description will follow with reference to electrically conductive member 186 with an understanding that electrically conductive members 187 and 188 include similar structure. As shown, electrically conductive member 186 includes a first end section 243 that extends to a second end section 244 through and intermediate section 245. First end section 243 defines a first connection zone 248 while second end section 244 defines a second connection zone 250. First connection zone 248 includes an orifice 260 that is configured and disposed to receive a connector member 262. In a manner similar to that described above, connector member 262 provides a interface to external electrical connections (not shown). Second connection zone 250 includes an orifice 270 within which is positioned a connecting member 272. Connecting member 272 provides an interface with ring member 175.

In accordance with the exemplary embodiment, fluid passing through fluid circuit 160 enters into fluid cavity 210 via inlet 212. The fluid then passes into inlet section 232 of first portion 235 of fluid passage 230. The fluid provides a heat exchange medium that flows in proximity to first end section 243 of electrically conductive member 186. The fluid passes to second portion 236 and absorbs heat generated by electricity flowing through electrically conductive member 186 to become a heat-entrained fluid thereby lowering temperatures at first connection zone 248. The heat entrained fluid then passes to third portion 237 in proximity to intermediate section 245 absorbing additional heat from electrically conductive member 186. The heat entrained fluid then passes from outlet section 233 back into electric machine 132. The heat-entrained fluid is cooled by, for example, a fan (not shown) mounted to a rotor member (also not shown) of electric machine 132. Once the heat is removed, the fluid re-enters electric machine 2 and is circulated in a manner similar to that described above. Of course, it should be understood that the fluid could exit from terminal block 180 be circulated through an external fluid cooling system or simply passed to a drain. With this arrangement, terminal block 180 not only provides a robust machine attachment terminal, but also provides passages for channeling fluid in proximity to electrical conductors in order to carry away generated heat while maintaining a compact form factor and without sacrificing motor performance.

Terminal block 180 not only provides insulation but also provides structure for delivering a fluid in proximity to each electrically conductive member 186-188. That is, fluid flowing through fluid circuit 160 enters inlet section 232 of fluid passage 230. The fluid flows along first end section 243 of electrically conductive member 186. In this manner, heat within electrically conductive member 186 is exchanged with the fluid in order to lower temperatures at first connection zone 248. The fluid then passes to third portion 237 and along intermediate section 245 of electrically conductive member 186. At this point it should be understood that while the fluid is described as flowing along portions of electrically conductive member 186, the term along should be construed to include fluid flowing in proximity to and/or in direct contact with electrically conductive member 186. The fluid exchanges heat with electrically conductive member 186 to lower temperatures within terminal block 180. With this arrangement, the exemplary embodiment provides a robust motor attachment terminal.

At this point it should be understood that the exemplary embodiments provide a robust motor attachment terminal that provides passages for channeling fluid in proximity to electrical conductors in order to absorb or carry away heat by electricity flowing through electrical conductors while maintaining a compact form factor and without sacrificing motor performance. In addition to providing a cooling medium, the terminal block shields associated connections from environmental conditions as well as inadvertent contact.

While the invention has been described with reference to an exemplary embodiment or embodiments, it will be understood by those skilled in the art that various changes may be made and equivalents may be substituted for elements thereof limitation with reference to the figures without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine comprising:
    a housing including an outer surface and an inner surface that defines an interior portion, the housing including a connection zone;
    a fluid circuit passing, at least in part, through the housing, the fluid circuit including an inlet portion and an outlet portion; and
    a stator assembly arranged within the interior portion of the housing, the stator assembly including at least one connector lead, and a terminal block extending through the housing, the terminal block comprising:
        a non-electrically conductive member that is sealed against the housing, the non-electrically conductive member including a fluid cavity; and
        at least one electrically conductive member covered, at least in part, by the non-electrically conductive member, the at least one electrically conductive member including a connection zone, wherein the fluid cavity is configured and disposed to guide a liquid coolant in a heat exchange relationship along the connection zone to absorb heat.

2. The electric machine according to claim 1, wherein the non-electrically conductive member includes a crown portion and a leg portion, the fluid cavity being arranged in the crown portion.

3. The electric machine according to claim 2, wherein the fluid cavity includes an inlet that registers with the inlet portion and an outlet, the fluid cavity extending along a portion of the electrically conductive member.

4. The electric machine according to claim 3, further comprising: a fluid passage arranged within the crown portion, the fluid passage having an inlet section that is fluidly connected to the outlet and an outlet section that is fluidly connected to the outlet portion.

5. The electric machine according to claim 4, wherein the fluid passage extends along a portion of the fluid cavity.

6. The electric machine according to claim 4, wherein the fluid passage extends along another portion of the electrically conductive member.

7. The electric machine according to claim 1, further comprising: an insert member that defines, at least in part, a fluid passage, the insert member being arranged within the fluid cavity.

8. The electric machine according to claim 7, wherein the fluid passage includes an inlet section that registers with the inlet portion and an outlet section that registers with the outlet portion, the fluid passage guiding a fluid along a portion of the electrically conductive member.

9. The electric machine according to claim 8, wherein the fluid passage comprises a channel formed in the insert member.

10. A terminal block comprising:
a non-electrically conductive member including a fluid cavity; and
at least one electrically conductive member covered, at least in part, by the non-electrically conductive member, the at least one electrically conductive member including a connection zone, wherein the fluid cavity is configured and disposed to guide a liquid coolant in a heat exchange relationship along the connection zone to absorb heat.

11. The terminal block according to claim 10, wherein the non-electrically conductive member includes a crown portion and a leg portion, the fluid cavity being arranged in the crown portion.

12. The terminal block according to claim 11, wherein the fluid cavity includes an inlet and an outlet, the fluid cavity extending along a portion of the electrically conductive member.

13. The terminal block according to claim 12, further comprising: a fluid passage arranged within the crown portion, the fluid passage having an inlet section that is fluidly connected to the outlet and an outlet section.

14. The terminal block according to claim 13, wherein the fluid passage extends along a portion of the fluid cavity.

15. The terminal block according to claim 13, wherein the fluid passage extends along another portion of the electrically conductive member.

16. The terminal block according to claim 10, further comprising: an insert member including a fluid passage arranged within the fluid cavity.

17. The terminal block according to claim 16, wherein the fluid passage includes an inlet section and an outlet section, the fluid passage guiding a fluid along a portion of the electrically conductive member.

18. The terminal block according to claim 17, wherein the fluid passage comprises a channel formed in the insert member.

19. A method of cooling a stator terminal block, the method comprising:
passing a fluid through a portion an electric machine;
guiding the fluid through a fluid cavity formed in a non-electrically conductive portion of a terminal block;
receiving heat from a portion of an electrically conductive member provided in the terminal block into the fluid;
passing the fluid out from the terminal block;
passing the fluid from the fluid cavity into a fluid passage formed in the terminal block; and
receiving heat from another portion of the electrically conductive member into the fluid.

* * * * *